United States Patent
Lermant et al.

(10) Patent No.: US 7,648,293 B2
(45) Date of Patent: *Jan. 19, 2010

(54) METHODS AND APPARATUS FOR MEDIA SELECTION IN CLUSTER PRINTING SYSTEMS

(75) Inventors: Pierre Lermant, Sunnyvale, CA (US); Nick Hartzel, Stillwater, MN (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/736,466

(22) Filed: Apr. 17, 2007

(65) Prior Publication Data

US 2007/0189827 A1 Aug. 16, 2007

Related U.S. Application Data

(63) Continuation of application No. 11/299,435, filed on Dec. 12, 2005, now Pat. No. 7,229,225, which is a continuation of application No. 10/980,530, filed on Nov. 3, 2004, now Pat. No. 6,974,269, which is a continuation of application No. 10/610,128, filed on Jun. 30, 2003, now Pat. No. 6,962,449.

(51) Int. Cl.
*B41J 29/38* (2006.01)
*G06F 3/12* (2006.01)
(52) U.S. Cl. .................................... 400/76; 358/1.15
(58) Field of Classification Search ............. 400/61–63, 400/67, 68, 76; 358/1.1–1.18, 1.9
See application file for complete search history.

(56) References Cited

U.S. PATENT DOCUMENTS

| 5,267,727 | A | 12/1993 | DeHority |
| 5,467,434 | A | 11/1995 | Hower, Jr. et al. |
| 6,348,971 | B2 | 2/2002 | Owa et al. |
| 6,447,184 | B2 | 9/2002 | Kimura et al. |
| 6,552,813 | B2 | 4/2003 | Yacoub |
| 6,700,678 | B1 | 3/2004 | Luman |
| 6,752,082 | B2 | 6/2004 | Derhak et al. |
| 2002/0097424 | A1 | 7/2002 | Ferlitsch |
| 2003/0044194 | A1 | 3/2003 | Bodine et al. |
| 2003/0046131 | A1 | 3/2003 | Holzwarth |
| 2004/0218201 | A1 | 11/2004 | Lermant et al. |

FOREIGN PATENT DOCUMENTS

WO  WO 02/067059 A2  8/2002

OTHER PUBLICATIONS

"Paper Catalog Utility User's Guide, Rel. 4," Heidelberg Digital L.L.C., Jan. 2001.
PCT/US2004/018287 Int'l Search Report & Written Opinion in Related WO Case, Oct. 22, 2004, Lermant et al.
PCT/US2004/018287 Int'l Prelim Exam Report in Related WO Case, May 8, 2006, Lermant et al.

*Primary Examiner*—Daniel J Colilla
(74) *Attorney, Agent, or Firm*—Michael A. Glenn; Glenn Patent Group

(57) ABSTRACT

Methods and apparatus are provided for specifying media in cluster printing systems that include printers that use device-specific media selection techniques, such as paper catalogs, media tray pulldown menus and media attribute pulldown menus.

15 Claims, 13 Drawing Sheets

| UNIVERSAL PAPER CATALOG | | | | | |
|---|---|---|---|---|---|
| Label | Size | Type | Weight (g/m²) | Color | Hole Punch | Tab Positions |
| Default | Letter | Plain | 75 | White | No | 0 |
| XYZ Co. | A4 | Bond | 80 | Buff | No | 0 |
| Generic Labels | Letter | Label | 70 | White | No | 0 |
| John's Tabs | 9x11" | Tab | 75 | Blue | No | 5 |

| Universal Paper Catalog | Paper Catalog 1 | Paper Catalog 2 |
|---|---|---|
| Label = Default<br>Type = Plain<br>Color = White<br>Tab Positions = 0 | Name = Standard    Size = Letter<br>Color = White        Weight = 75<br>Type = Plain<br>Mode = 1, 2 sided/ punchable | Style = Default    Size = Letter<br>Type = Plain        Weight = Medium<br>Color = White |
| Label = XYZ Co.<br>Type = Bond<br>Color = Buff<br>Tab Positions = 0 | Name = XYZ Co.    Size = A4<br>Color = Buff          Weight = 80<br>Type = Bond<br>Mode = 1, 2 sided/ punchable | Style = Custom    Size = A4<br>Type = Plain        Weight = Heavy<br>Color = White |
| Label = Generic Labels    Size = Letter<br>Type = Label               Weight = 70<br>Color = White<br>Hole Punch = No | Name = Labels    Size = Letter<br>Color = White     Weight = 70<br>Type = Label<br>Mode = 1 sided/ punchable | Style = Label    Size = Letter<br>Type = Label     Weight = Light<br>Color = White |
| Label = John's Tabs    Size = 9x11"<br>Type = Tab              Weight = 75<br>Color = Blue<br>Tab Positions = 5    Hole Punch = No | Name = Tab 1    Size = 9x11"<br>Color = Blue     Weight = 75<br>Type = Color<br>Mode = 1 sided/ punchable | Style = Tab    Size = Standard Tab<br>Type = Color    Weight = Light<br>Color = Blue |
| ... | ... | ... |

*FIG. 12*

| Tray and Media Association | | | |
|---|---|---|---|
| Printer | Paper Catalog Label | Media Type | |
| ⊞ Printer 32a | | | OK |
| ⊞ Printer 32b | | | CANCEL |
| ⊟ Printer 32c | | | |
| Tray 1 | Default | Plain | |
| Tray 2 | XYZ Co. | Bond | |
| Tray 3 | Default | Plain | |
| ⊟ Printer 32d | | | |
| Tray 1 | Generic Labels | Label | |
| Tray 2 | John's Tabs | Tab | |

FIG. 13

METHODS AND APPARATUS FOR MEDIA SELECTION IN CLUSTER PRINTING SYSTEMS

REFERENCE TO RELATED APPLICATIONS

This application is a continuation of U.S. application Ser. No. 11/299,435, filed 12 Dec. 2005, now U.S. Pat. No. 7,229,225, which is a continuation of United States application Ser. No. 10/980,530, filed 3 Nov. 2004, now U.S. Pat. No. 6,974,269, which is a continuation of U. S. application Ser. No. 10/610,128, filed 30 Jun. 2003, now U.S. Pat. No. 6,962,449.

BACKGROUND

This invention relates to digital printing, and more particularly to cluster printing systems. Most print output devices, such as copiers, printers, facsimile machines and other similar print output devices (collectively referred to as "printers"), may be used with a wide variety of output media. Indeed, conventional printers typically include one or more media trays that accept many different media types, sizes, colors and weights. When a user submits a print job to such a printer, such as by selecting a "Print" function from within a word processing, spreadsheet, page layout, or other software application, the application typically calls a print driver that permits the user to specify numerous print output specifications, such as a desired media for the print job. A user interface on conventional print drivers typically includes pull-down menus that allow the user to select a specific media tray or specific media attributes for printing the print job. For example, if a user knows that desired media are loaded in Tray 2 of the printer, the user may select Tray 2 from a media tray pulldown menu, and the print job will be printed on media extracted from Tray 2. Alternatively, a print driver may allow a user to specify media attributes, such as type, size, color or other attribute rather than specifying a particular media tray. For example, if any of a printer's media trays includes Letterhead paper, a user may specify Letterhead from a media type pulldown menu, and the print job will be printed on media extracted from a tray that includes Letterhead.

For conventional office or home printers, the number of different media trays and attributes is usually small, and the media specification process is usually quite straightforward. Indeed, most office or home printers include only a few media trays, and typically use only a handful of different media attributes. For commercial print shop printers, however, the number of different media sources and attributes may be quite large. Indeed, a commercial print shop printer may have many different media trays that may be loaded with media having a large number of different attributes. For example, a printer used in a print shop may have six media trays that each may be loaded with media having any of twenty different colors, ten different sizes, five different weights, and three different hole-punching styles.

If a printer supports many different media attributes, the printer may provide pulldown menus for selecting media attributes, such as media size, type, weight, color, and other attributes. Thus, a user may find it quite time consuming to specify each media attribute for every print job. To simplify this selection process, some previously known print systems include a paper catalog for media selection. An exemplary previously known paper catalog is illustrated in FIG. 1. Paper catalog 10 is a two-dimensional array that associates one or more media names 12 with a corresponding set of media attributes 14. In the illustrated example, media names 12 are associated with attributes "Size," "Color," "Weight" (in grams per square meter, "g/m$^2$"), "Type," and "Mode." A system administrator typically creates the various entries in the paper catalog for commonly used media. Once the paper catalog is created, a user may specify desired media for a print job by selecting any one of the entries in the catalog via a print driver or other job submission means, such as a proprietary downloader or Web submission means.

For example, a paper catalog may include a first entry named "Letter" to designate media that are 8.5×11", white, 75 g/m$^2$, plain, single sided or double sided, and capable of being hole-punched, and a second entry named "Letter Pink" to designate media that are 8.5×11", pink, 75 g/m$^2$, plain, single sided or double sided, and capable of being hole-punched. For print systems that use a paper catalog, the media selection process is simple. Rather than navigating through numerous media attribute pulldown menus and submenus, a user instead only needs to select a desired media name from a single paper catalog pulldown menu. When the print job is submitted to the printer, the media attributes associated with the selected media name will be communicated to the printer, and the printer will extract media from the appropriate tray that includes media having those attributes. Paper catalogs therefore have greatly simplified the media selection process.

In addition to improvements in the media selection process, print systems have also advanced in other ways in recent years. Indeed, print technology has advanced to provide "cluster printing," in which multiple printers may be coupled together in a network. In particular, cluster printing systems may be used to couple multiple printers together to form "virtual printer groups." One exemplary cluster printing system is Velocity™ workflow software, including the Velocity Balance Server™, licensed by Electronics for Imaging, Inc., Foster City, Calif. Velocity software may be used to couple many printers together, regardless of brand and model, to appear as a single virtual printer group on a network. Velocity software can load balance a single "long" print job among multiple printers, split color from black-and-white pages in the same document, route a print job to the best available printer based on the number of pages and other characteristics, send a print job to an alternate printer if a currently selected printer is out of paper or toner or if there is a paper jam, and automatically send certain types of jobs to specific printers, based on specified criteria such as media characteristics, finishing options and device capabilities.

Referring to FIG. 2, an exemplary previously known cluster printing system is described. Cluster printing system 20 includes one or more client devices 22a-22c coupled to server 28, which is also coupled to one or more printers 32a-32d. Client devices 22a-22c may be personal computers, laptop computers, handheld computers, computer workstations, personal digital assistants, cell-phones, fax machines, or any similar device that may be used to provide print jobs 24a-24c, respectively, for printing. Client devices 22a-22c may be coupled directly to server 28, or may be coupled to server 28 via a communications network 26. Server 28 may be a personal computer, laptop computer, handheld computer, computer workstation or any similar device that includes software and/or hardware that provides cluster printing capabilities.

Printers 32a-32d may be printers, copiers, fax machines, laser printers, plotters, inkjet printers, wide format printers, or other similar printers that may be used to provide print output 34a-34d, respectively. Printers 32a-32d may be the same make and model, or may include more than one make and model of printer. For example, printer 32a may be a 12 page per minute ("ppm") black and white printer, printer 32b may be a 50 ppm black and white printer, printer 32c may be a 32 ppm color printer, and printer 32d may be a 75 ppm color printer. Printers 32a-32d may be coupled directly to server 28, or may be coupled via network 30. Networks 26 and 30 each may be a local area network, wide area network, wireless network, the Internet, or any similar network. Networks 26 and 30 each may be a single network or may include multiple networks, and the two networks may be the same network.

A user of any of client computers 22a-22c, such as client computer 22a, may create virtual printer clusters that include various combinations of printers 32a-32d. For example, a user of client computer 22a may form a first virtual printer group including printers 32a and 32b, a second virtual printer group including printers 32c and 32d, a third virtual printer group including printers 32b, 32c and 32d, and so on. A corresponding print driver for each virtual printer group may then be installed on client computer 22a, and print job 24a may then be submitted to any of the virtual printer groups by specifying the desired virtual printer group from a printer selection menu.

One problem associated with previously known cluster printing systems, however, pertains to media selection. Because cluster printing systems may be configured with printers that include more than one make and model of printer, the constituent printers in each virtual printer group may not use a single media selection process. For example, some printers in a cluster printing system may provide media selection via a paper catalog, other printers may provide media selection via media tray pulldown menus, and still other printers may provide media selection via media attribute pulldown menus. Further, even if several printers provide media selection via paper catalogs, the printers may not use the same paper catalog. Thus, printer 32a may provide media selection via a first paper catalog, printer 32b may provide media selection via a second paper catalog that differs from the first paper catalog, printer 32c may provide media selection via media tray pulldown menus, and printer 32d may provide media selection via media attribute pulldown menus.

Previously known cluster printing systems typically address this issue by providing print drivers that include a superset of media selection options for all printers in the corresponding virtual printer group. Thus, a print driver for a virtual printer group that includes all four printers 32a-32d may permit media selection using the first paper catalog, the second paper catalog, the media tray pulldown menu and optionally other media attribute pulldown menus, such as a media type pulldown menu. A problem may occur, however, if these different media selection techniques do not use a consistent convention for designating media. For example, printer 32a and printer 32b each may have three paper trays, with the first, second and third trays of each printer loaded with white paper having weights of 80 g/m$^2$, 75 g/m$^2$ and 70 g/m$^2$, respectively. The first paper catalog may classify theses media weights as "Heavy," "Medium," and "Light," respectively, whereas the second paper catalog may classify the exact same media weights as "80 g/m$^2$," "75 g/m$^2$," and "70 g/m$^2$," respectively. If a user submits print job 24a to the virtual printer group and selects an entry from the first paper catalog that specifies Medium weight paper, the entire print job will be sent only to printer 32a, because only printer 32a recognizes a media weight designated as Medium. This is true even though printer 32b is a faster printer that has the exact same media as printer 32a, and could print some or all of the print job.

In view of the foregoing, it would be desirable to provide methods and apparatus for simplifying and unifying the media selection process for cluster printing systems.

It further would be desirable to provide to provide methods and apparatus for providing a universal paper catalog for cluster printing systems.

SUMMARY

This invention provides methods and apparatus for specifying media in cluster printing systems that include printers that use device-specific media selection techniques, such as paper catalogs, media tray pulldown menus and media attribute pulldown menus. An exemplary cluster printing system includes a server computer coupled to a client device and a plurality of printers, the plurality of printers coupled to form a virtual printer group, wherein the server computer further includes a paper catalog having a plurality of entries, each entry associating a name with a media attribute, and a media selector tool adapted to allow a user of the client device to select media for printing a print job to the virtual printer group by selecting an entry in the paper catalog. An exemplary method includes providing a paper catalog that has a plurality of entries, each entry associating a name with a media attribute, and selecting an entry in the paper catalog to select media for printing a print job to the virtual printer group.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 7 is an exemplary embodiment of a user interface window in accordance with this invention;

FIG. 11 is an exemplary embodiment of another user interface window in accordance with this invention;

FIG. 12 is an exemplary embodiment of a paper catalog translator in accordance with this invention;

FIG. 13 is an exemplary embodiment of a tray associator in accordance with this invention.

DETAILED DESCRIPTION

Figure 1:
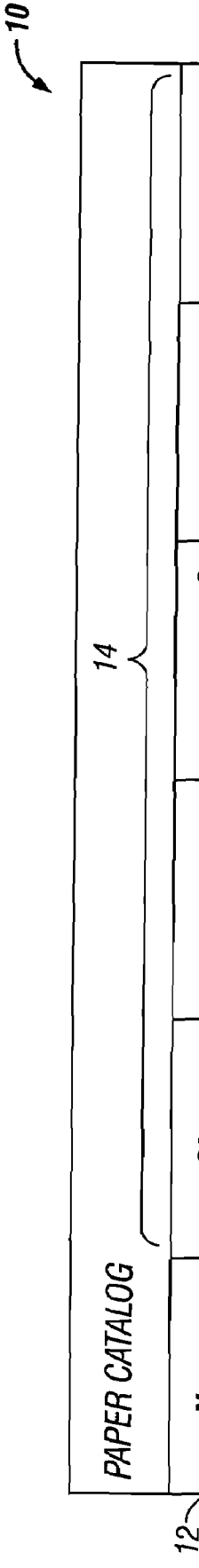
FIG. 1 is an illustration of a previously known paper catalog.
Figure 2:
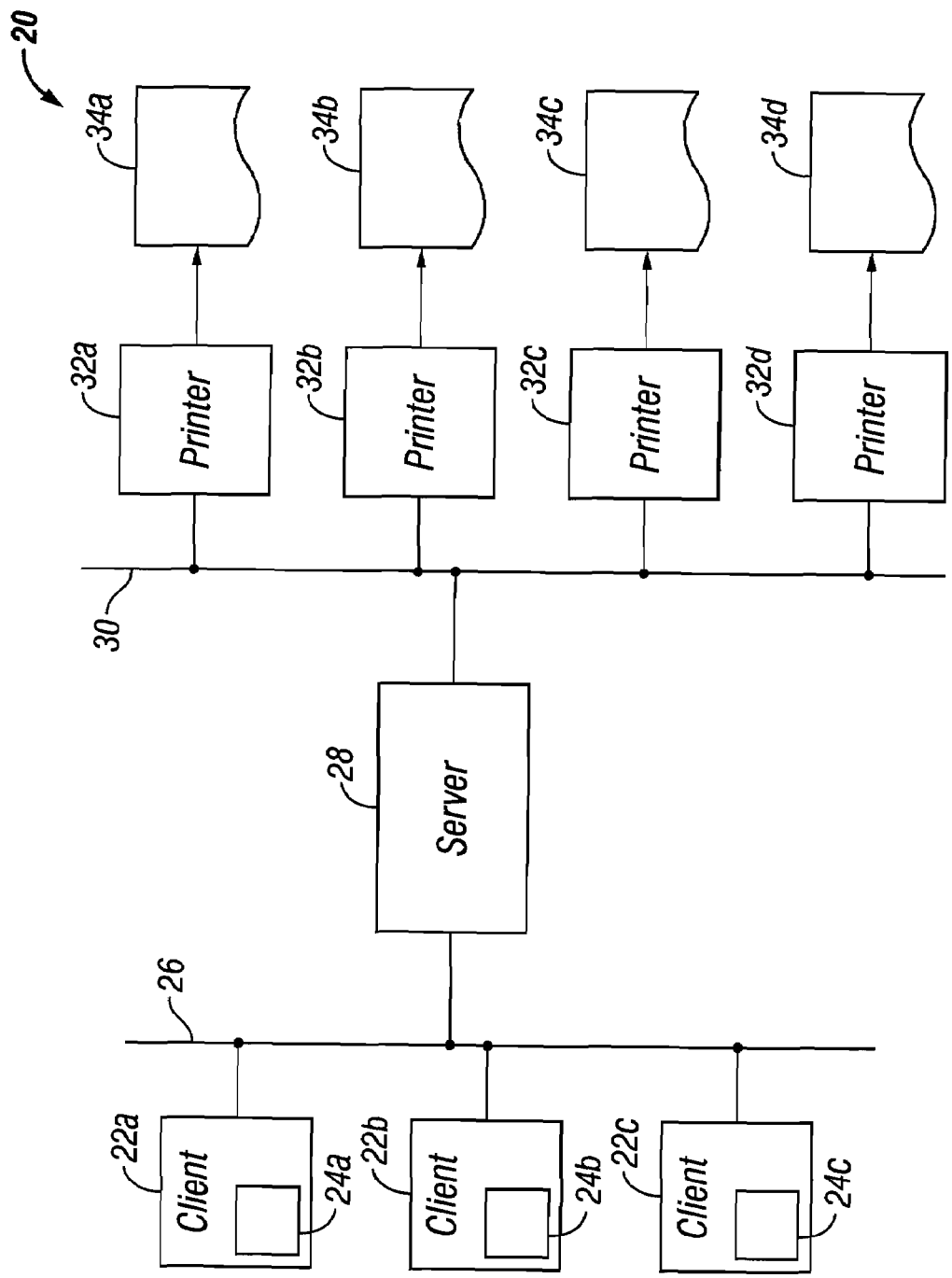
FIG. 2 is a block diagram of a previously known cluster printing system.
Figure 3:
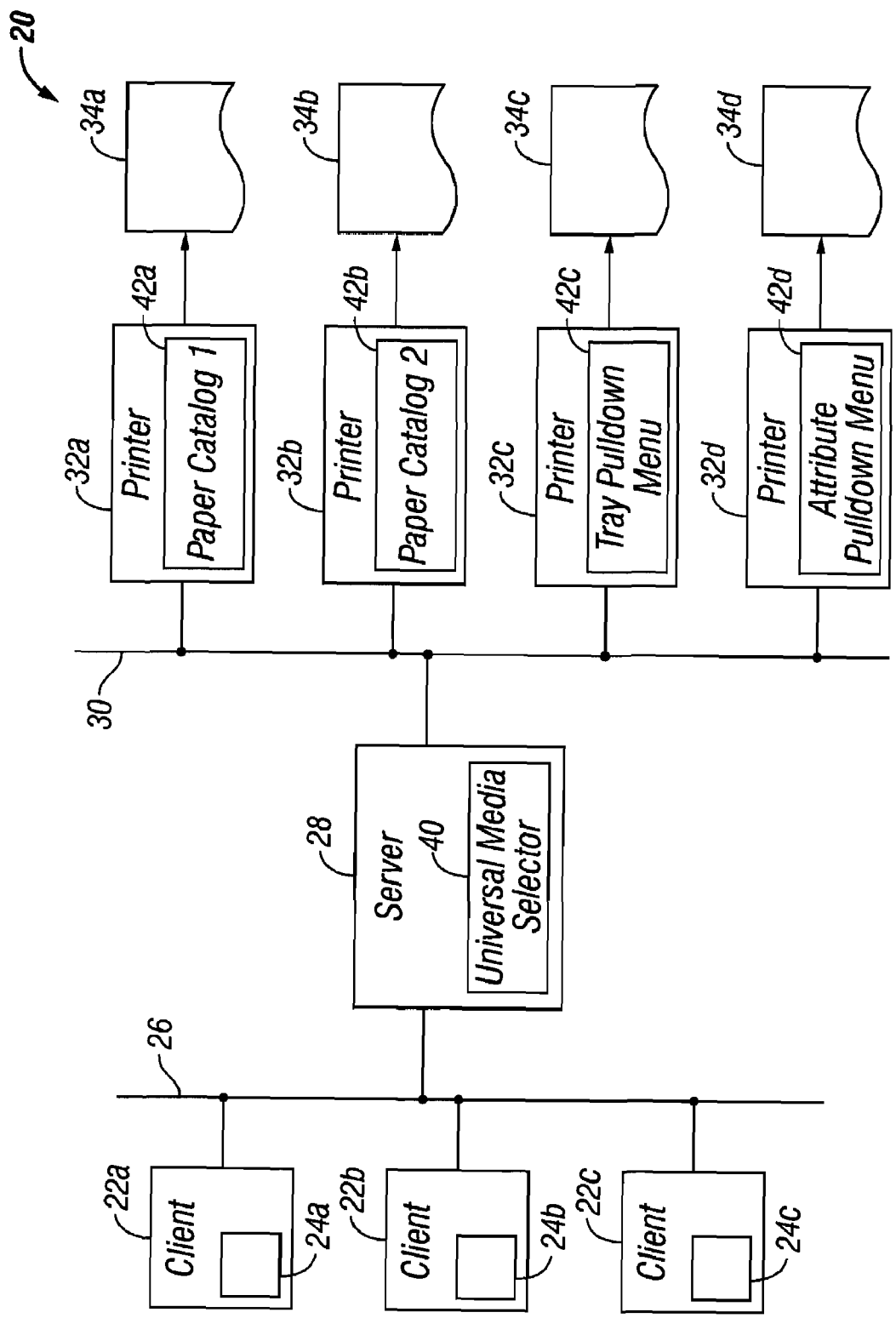
FIG. 3 is a block diagram of an exemplary cluster printing system in accordance with this invention.

Referring to FIG. 3, an exemplary cluster printing system 20' in accordance with this invention is described. Cluster printing system 20' includes client devices 22a-22c coupled to server 28', which is also coupled to printers 32a-32d. Although three client devices 22a-22c and four printers 32a-

32d are shown in FIG. 3, a greater or lesser number of devices may be included in cluster printing system 20'. One or more of client devices 22a-22c may be coupled directly to server 28', or may be coupled via network 26. Similarly, one or more of printers 32a-32d may be coupled directly to server 28', or may be coupled via network 30.

In accordance with this invention, server 28' includes universal media selection tool 40, described in more detail below. Each of printers 32a-32d uses a corresponding device-specific media selection technique 42a-42d, respectively, to select media for that printer. For example, media selection technique 42a may be a first paper catalog (e.g. "Paper Catalog 1"), media selection technique 42b may be a second paper catalog (e.g., Paper Catalog 2), media selection technique 42c may be a media tray pulldown menu, and media selection technique 42d may be a media attribute pulldown menu, such as a media type pulldown menu. Paper Catalog 1 and Paper Catalog 2 may be the same paper catalog, or may be different paper catalogs. As described in more detail below, universal media selection tool 40 permits a user of any of client devices 22a-22c to specify media for printing print jobs 24a-24c on any virtual printer group including printers 32a-32d using a universal paper catalog.

Figures 4, 5:
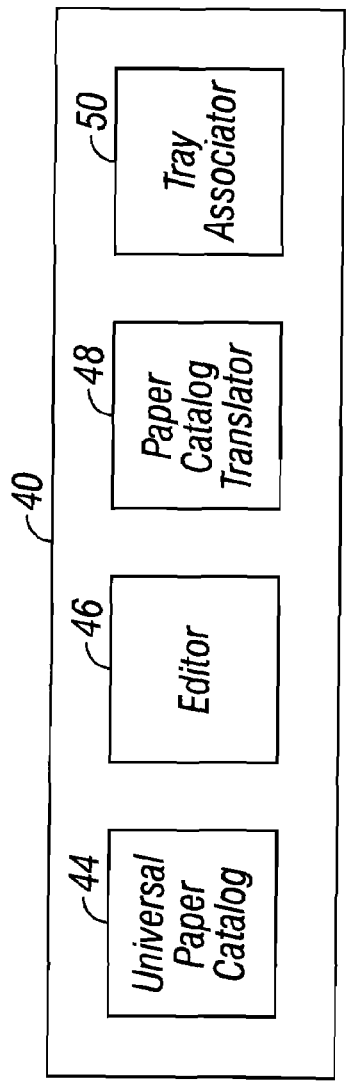
FIG. 4 is a block diagram of an exemplary embodiment of a universal media selector in accordance with this invention.
FIG. 5 is an illustration of an exemplary universal paper catalog in accordance with this invention.

Referring now to FIG. 4, an exemplary universal media selection tool 40 in accordance with this invention is described. Universal media selection tool 40 includes universal paper catalog 44, entry editor 46, paper catalog translator 48 and tray associator 50. FIG. 5 illustrates an exemplary universal paper catalog 44 in accordance with this invention. Universal paper catalog 44 is a two-dimensional array that includes one or more entries that each associate a media label 52 with corresponding media attributes 54. In the illustrated example, media labels 52 are associated with attributes "Size," "Type," "Weight," "Color," "Hole Punch," and "Tab Positions." Exemplary attributes 54 are media attributes typically encountered in cluster printing systems. Persons of ordinary skill in the art will understand that the attributes 54 other than those shown in FIG. 5 may be used, the order of the attributes may be interchanged, and more than or less than the number of attributes shown may be used.

Figure 6:
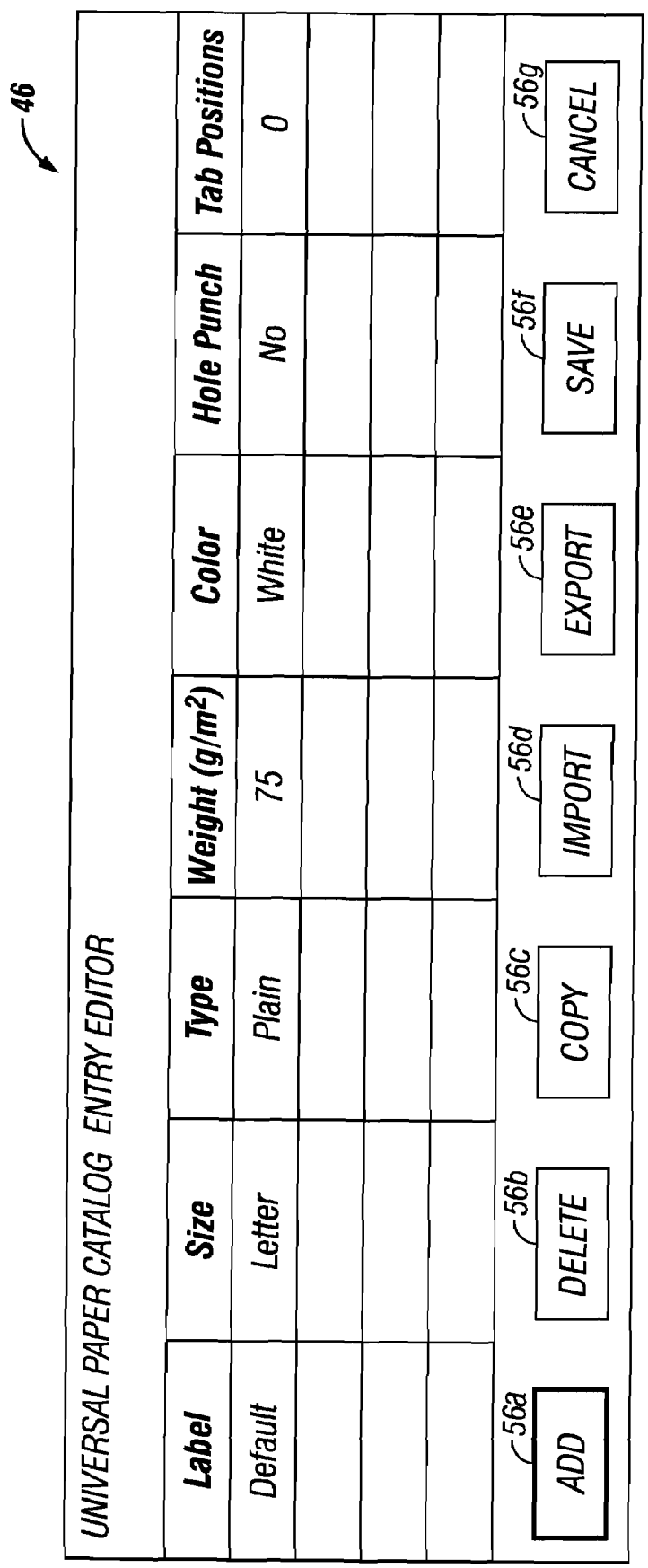
FIG. 6 is an exemplary embodiment of a universal paper catalog entry editor in accordance with this invention.

Referring again to FIG. 4, entry editor 46 may be used to create, import, export and edit paper catalog entries in universal paper catalog 44. FIG. 6 illustrates an exemplary embodiment of entry editor 46 in accordance with this invention. Entry editor 46 may be any conventional windowed user interface that displays entries from universal paper catalog 44 and includes function buttons 56a-56g for modifying the entries. Exemplary function buttons 56a-56g include "ADD," "DELETE," "COPY," "IMPORT," "EXPORT," "SAVE," and "CANCEL" functions. Persons of ordinary skill in the art will understand that function buttons in addition to or other than those shown in FIG. 6 may be used.

Figure 7:
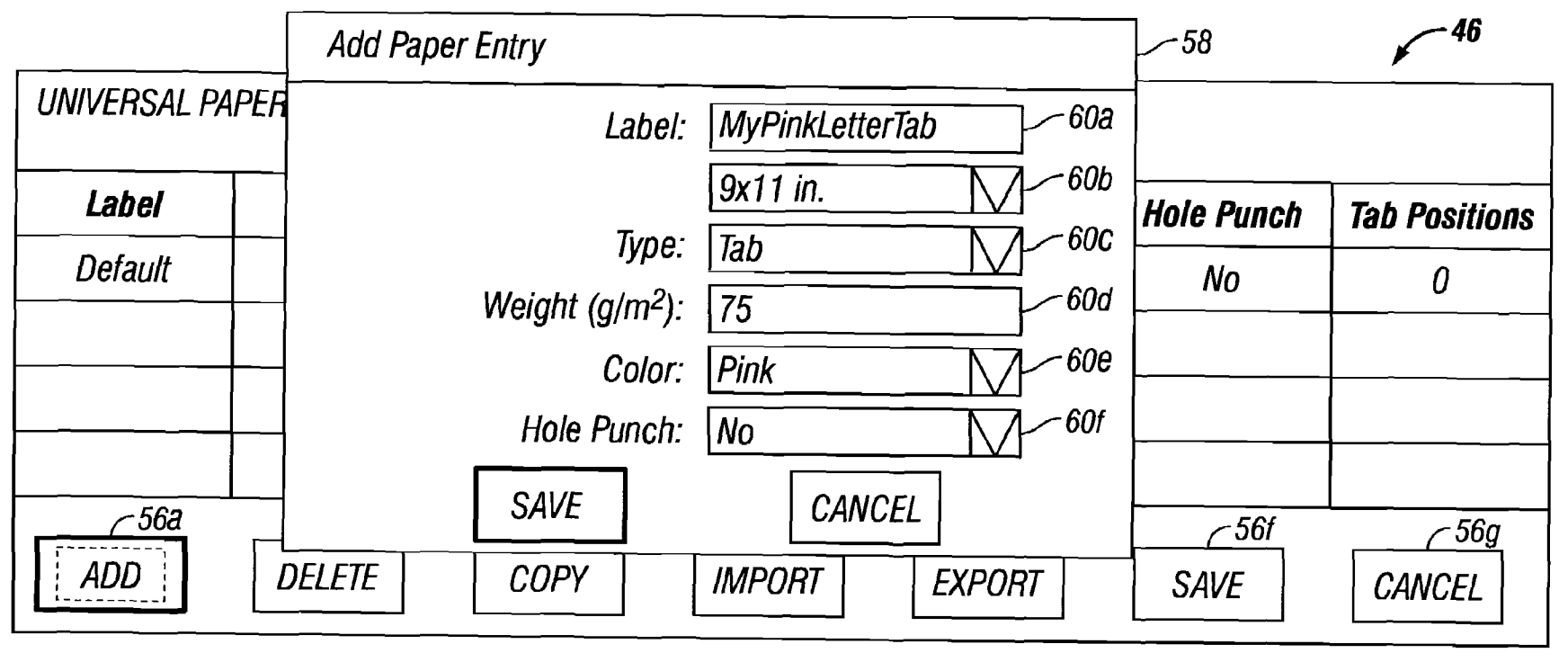

ADD function button 56a may be used to add a new entry to universal paper catalog 44. When ADD function button 56a is selected, an Add Paper Entry pop-up window 58 may be displayed, as shown in FIG. 7. Add Paper Entry window 58 includes editable fields 60a-60f for entering the information for each entry regarding Label, Size, Type, Weight, Color, and Hole Punch, respectively. Each of these fields will be discussed in turn.

Label field 60a may be used to enter an alphanumeric label used to identify the media associated with the entry. For example, "MyPinkLetterTab" may be used as an identifying label. Size field 60b may include a pulldown arrow for selecting the media size from a list of predetermined media sizes. For example, predetermined media sizes may include Letter, Legal, Tabloid, A4, A3, 9×11", 11×17", Envelope #10, and other commonly used sizes. Optionally, a "custom" size may be included that permits a user to specify a custom media size in English units, metric units, or points.

Type field 60c may include a pulldown arrow for selecting the media type from a list of predefined media types. For example, predetermined media types may include Plain, Letterhead, Label, Recycled, Transparent, Translucent, Tab, or other commonly used media types. Optionally, a "custom" type may be included in the pulldown list that permits a user to specify a custom media type. If the type is specified as "Tab," another pop-up window (not shown) may appear that enables the user to specify tab parameters, such as the number of tab positions (or number of cuts), tab offset dimensions, and other similar tab parameters.

Weight field 60d may be used to specify the media weight. For example, the media weight may be specified in $g/m^2$ as any value from 1-999 $g/m^2$. Persons of ordinary skill in the art will understand that any other unit of weight alternatively may be used. Color field 60e may include a pulldown arrow for selecting the media color from a list of predefined media colors. For example, predefined media colors may include white, red, yellow, green, blue, clear, pink, buff, goldenrod, gray, orange, ivory, purple, or other commonly used media colors. Optionally, a "custom" color may be included in the pulldown list that permits a user to specify a custom media color. Hole Punch field 60f may include a pulldown arrow for selecting from a list of predefined values the number of holes punched. For example, predefined values may include "Any," "Not Punched," "2," "3," or "4," or other commonly used values.

Referring again to FIG. 6, DELETE function button 56b may be used to delete selected entries in universal paper catalog 44. For example, a cursor may be positioned over a particular entry, and the DELETE button may be selected to delete that entry. COPY function button 56c may be used to copy an existing entry to a new entry that has a different label, but otherwise has identical attributes to the existing entry. IMPORT and EXPORT function buttons 56d and 56e, respectively, described in more detail below, may be used to import and export paper catalog entries to and from device-specific paper catalogs used by any printer coupled to server 28'. SAVE function button 56f may be used to save any changes made to universal paper catalog 44, and CANCEL function button 56g may be used to cancel any changes to the catalog.

Figure 8:
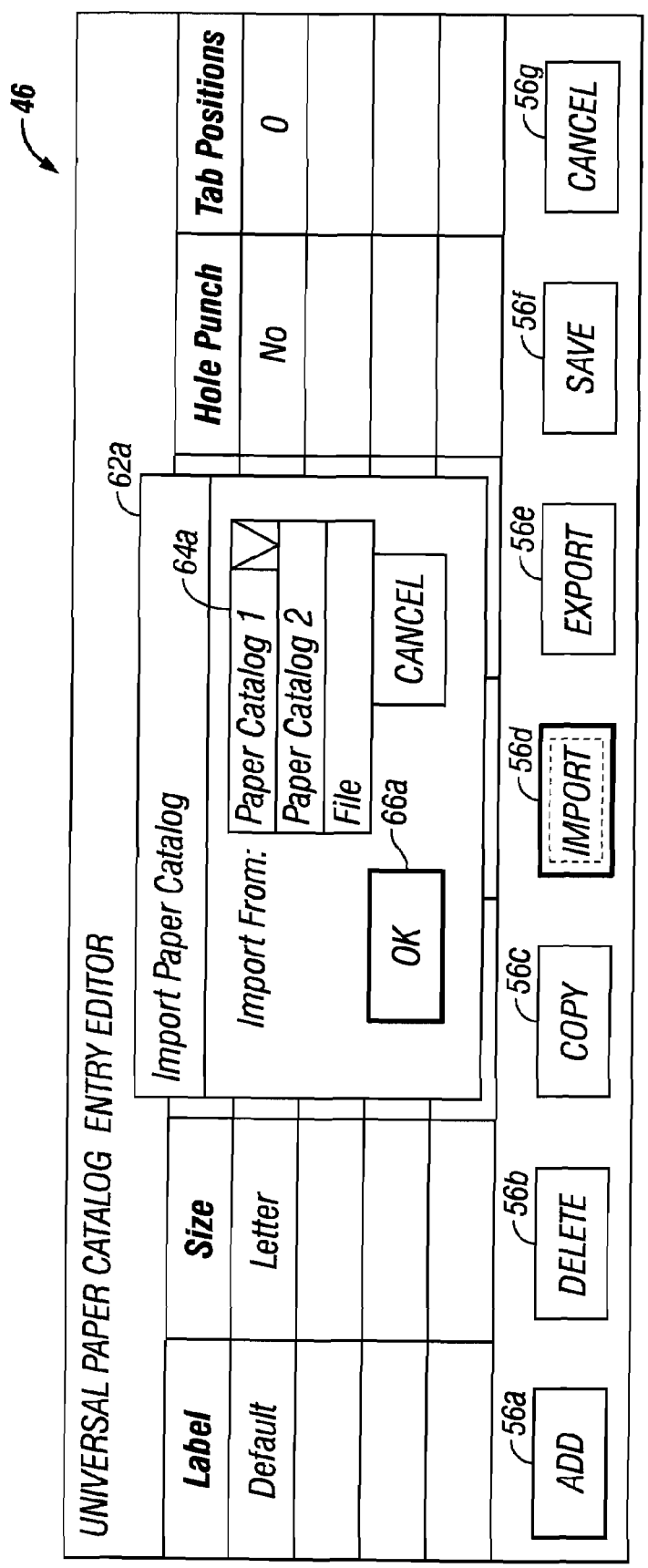
FIG. 8 is an exemplary embodiment of another user interface window in accordance with this invention.

As described above with regard to FIG. 3, printer 32a includes first paper catalog 42a, and printer 32b includes second paper catalog 42b. IMPORT function button 56d (FIG. 6) may be used to import entries in universal paper catalog 44 from entries in device-specific paper catalogs, or from files that use machine readable or human readable file formats, such as job description format ("JDF") or comma separated enumerations. Referring now to FIG. 8, when IMPORT function button 56d is selected from entry editor 46, an "Import Paper Catalog" pop-up window 62a may be displayed that includes pulldown menu 64a for selecting the desired device-specific paper catalog or file to import. As printers 32 are added to cluster printing system 20' (FIG. 3), the data used to populate pulldown menu 64a may be updated to include any paper catalog included in the added printer. Thus, as shown in FIG. 8, pulldown menu 64a includes entries for Paper Catalog 1 and Paper Catalog 2 of media selection procedures 42a and 42b, respectively.

Figure 9:
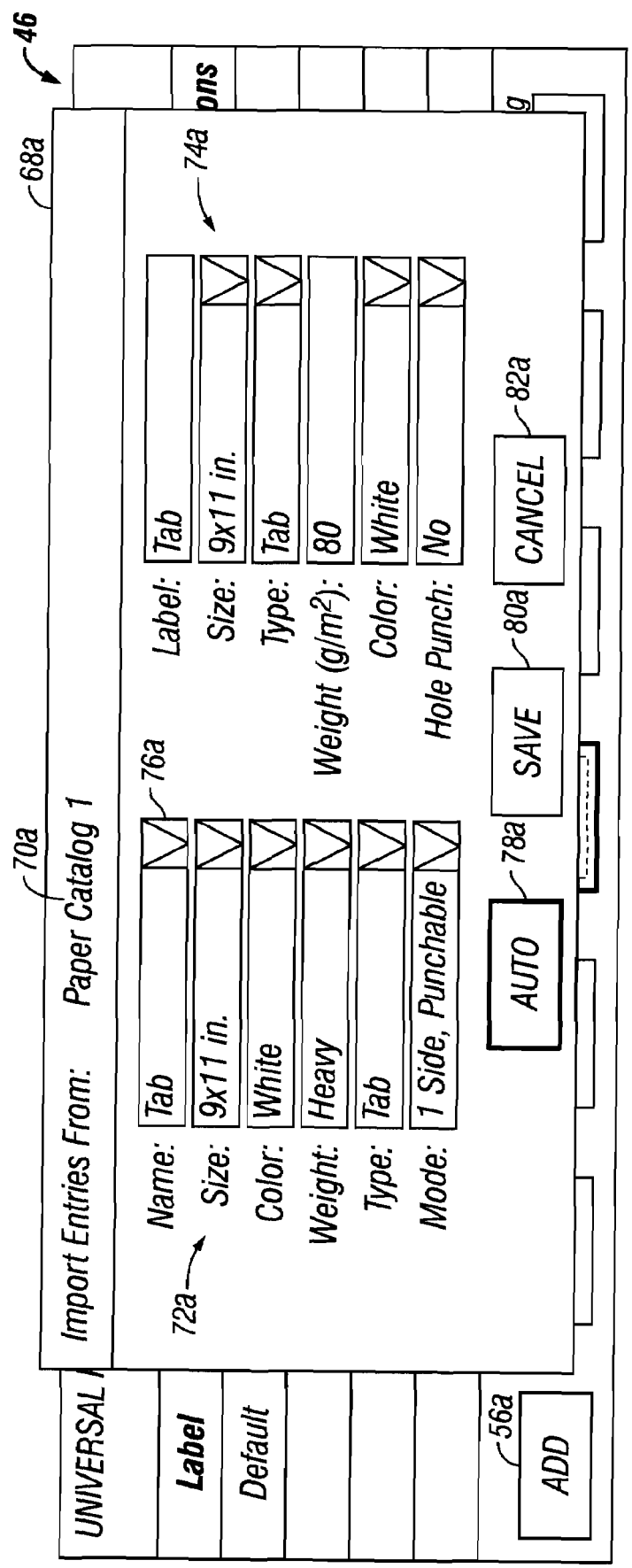
FIG. 9 is an exemplary embodiment of another user interface window in accordance with this invention.

Upon selecting OK button 66a in Import Paper Catalog window 62a, an "Import Entries" pop-up window 68a may be displayed, as illustrated in FIG. 9. Import Entries window 68a may include a title bar 70a that indicates the name of the selected device-specific paper catalog whose entries will be imported to universal paper catalog 44. In the exemplary embodiment shown in FIG. 9, Import Entries window 68a may be used to import entries from Paper Catalog 1 to entries in universal paper catalog 44. Import Entries window 68a may include a first section 72a listing the name and associated attributes for an entry in the selected device-specific paper catalog, and a second section 74a listing the label and associated attribute values for the corresponding entry in universal paper catalog 44. If the device-specific paper catalog includes more than one entry, pulldown arrow 76a may be used to select each entry from the catalog. As each entry is displayed, the associated attributes in first section 72a change accordingly.

For each displayed entry, the values in second section 74a may be modified manually in a manner similar to that described above in connection with Add Paper Entry window 58. That is, a user may manually edit the information for each entry regarding Label, Size, Type, Weight, Color, and Hole Punch. An optional "AUTO" function button 78a may be provided to automatically convert entries from the specified device-specific paper catalog to entries in universal paper catalog 44. In this regard, the AUTO function may use any conventional logic to predict the correct entry values in second section 74a. Following automatic conversion, the entry values in second section 74a may be manually modified if a user wants to alter the predicted values. Imported values may be saved using a SAVE function button 80a, or may be cancelled using a CANCEL function button 82a.

Figure 10:
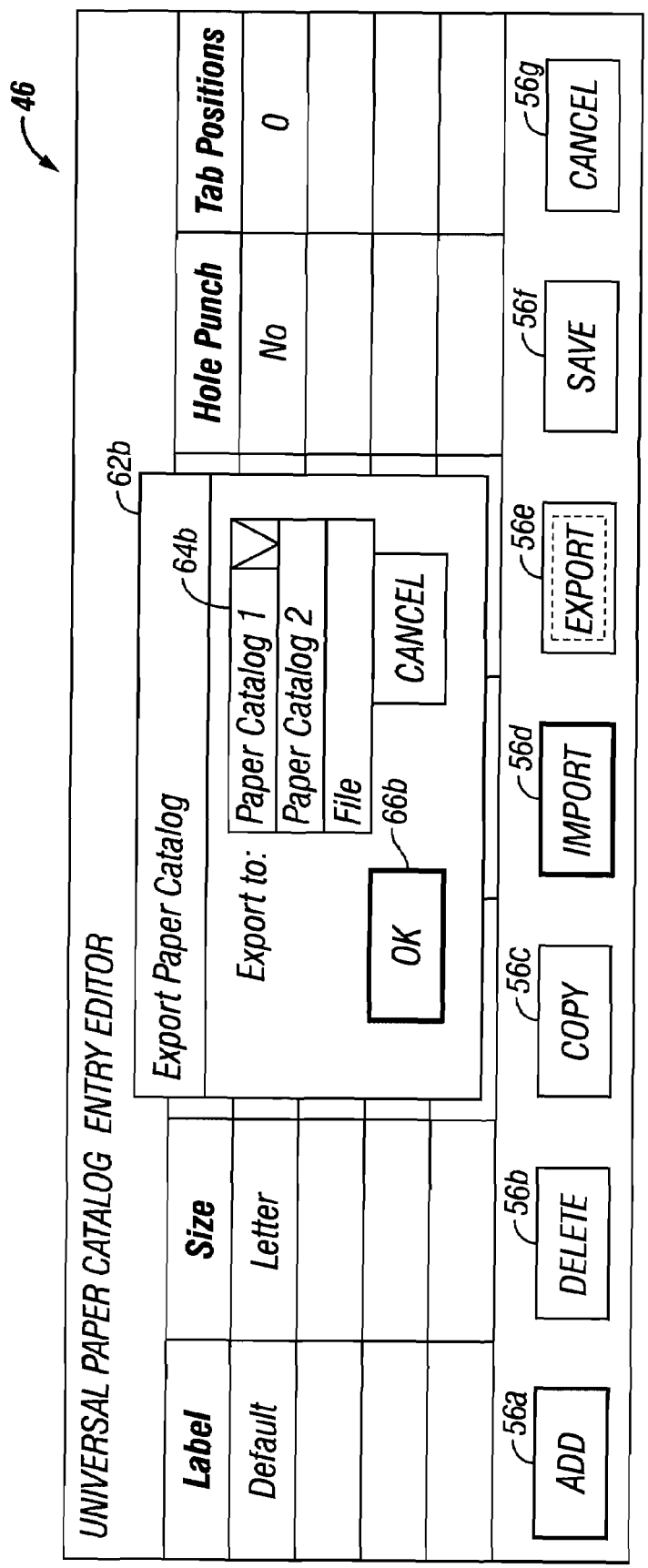
FIG. 10 is an exemplary embodiment of another user interface window in accordance with this invention.
Figure 14:
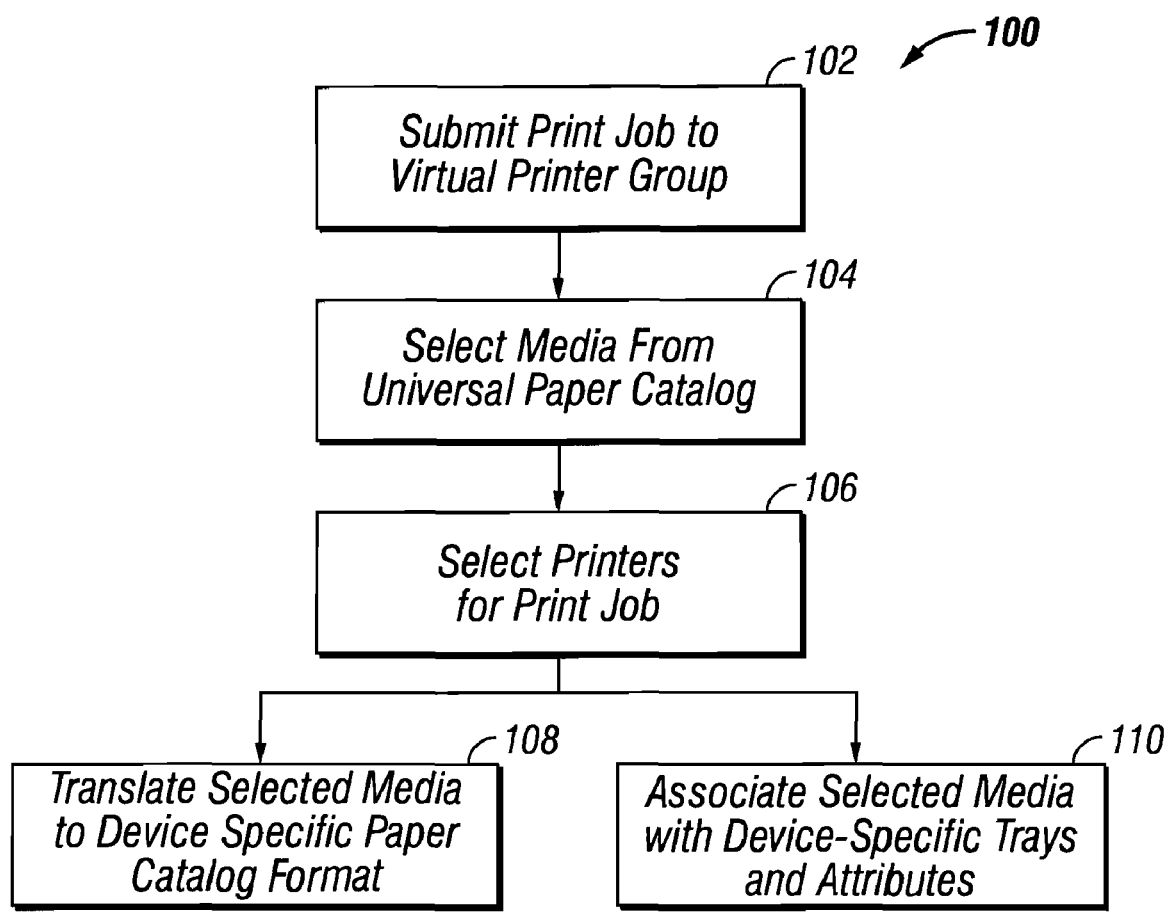
FIG. 14 is an exemplary method for selecting media in a cluster printing system in accordance with this invention.

Referring again to FIG. 6, EXPORT function button 56e may be used to export entries from universal paper catalog 44 to entries in device-specific paper catalogs, or to a file that uses machine readable or human readable file formats, like JDF or comma separated enumerations. Referring now to FIG. 10, when EXPORT function button 56e is selected from entry editor 46, an "Export Paper Catalog" pop-up window 62b may be displayed that includes pulldown menu 64b that allows a user to select a desired device-specific paper catalog or a file that will receive the exported data. As printers 32 are added to cluster printing system 20' (FIG. 3), the data used to populate pulldown menu 64b may be updated to include any paper catalog included in the added printer. Thus, as shown in FIG. 10, pulldown menu 64b includes entries for Paper Catalog 1 and Paper Catalog 2 of media selection procedures 42a and 42b, respectively, and also includes an entry for exporting entries in universal paper catalog 44 to a file.

Figure 11:
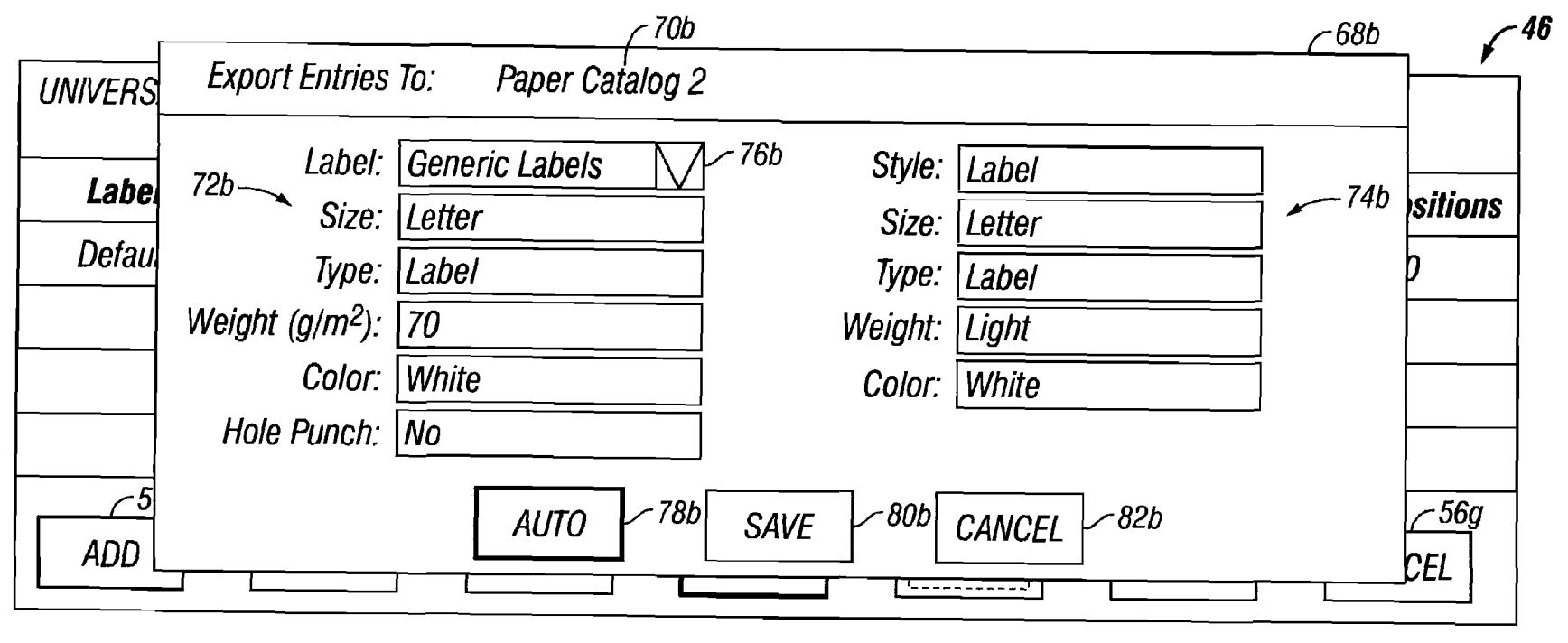

Upon selecting OK button 66b in Export Paper Catalog window 62b, an "Export Entries" pop-up window 68b may be displayed, as illustrated in FIG. 11. Export Entries window 68b may include a title bar 70b that indicates the name of the selected device-specific paper catalog or file that will receive entries from universal paper catalog 44. In the exemplary embodiment shown in FIG. 11, Export Entries window 68b may be used to export entries from universal paper catalog 44 to entries in Paper Catalog 2. Export Entries window 68 may include a first section 72b listing the label and associated attributes for an entry in universal paper catalog 44, and a second section 74b listing the style and associated attribute values for the corresponding entry in the selected device-specific paper catalog. If universal paper catalog 44 includes more than one entry, pulldown arrow 76b may be used to select each entry from the catalog. As each entry is displayed, the associated attributes in first section 72b change accordingly.

For each displayed entry, the values in second section 74b may be modified manually in a manner similar to that described above in connection with Add Paper Entry window 58. That is, a user may manually edit the information for each entry regarding Style, Size, Type, Weight and Color. An optional "AUTO" function button 78b may be provided to automatically convert entries from universal paper catalog 44 to entries in the specified device-specific paper catalog. In this regard, the AUTO function may use any conventional logic to predict the correct entry values in second section 74b. Following automatic conversion, the entry values in second section 74b may be manually modified if a user wants to alter the predicted values. Exported values may be saved using a SAVE function button 80b, or may be cancelled using a CANCEL function button 82b.

Referring again to FIGS. 3 and 4, once the entries in universal paper catalog 44 have been completed, the paper catalog may be used to specify media for use in cluster printing system 20'. That is, a user of any of client devices 22a-22c may select media for printing print jobs 24a-24c to any virtual printer group in cluster printing system 20' by selecting an entry from universal paper catalog 44. To process the print request, universal media selector 40 converts the specified media attributes to formats recognized by the printers in the virtual printer group. In particular, paper catalog translator 48 translates paper catalog entries between universal paper catalog 44 and device-specific paper catalogs of printers coupled to server 28', and tray associator associates paper catalog entries in universal paper catalog 44 with specific trays and attributes of printers coupled to server 28'.

FIG. 12 illustrates an exemplary paper catalog translator 48. Paper catalog translator 48 may be a two-dimensional array that may be used to translate attribute labels and associated values in universal paper catalog 44 to corresponding attribute names and associated values in device-specific paper catalogs. For example, paper catalog translator 48 includes entries for translating attribute labels and associated values in universal paper catalog 44 to and from corresponding attribute names and associated values in Paper Catalog 1 and Paper Catalog 2.

For example, universal paper catalog 44 may include an entry labeled "Generic Labels" that translates to and from entries named "Labels" in Paper Catalog 1 and styled "Label" in paper Catalog 2. Thus, if a user of any of client computers 22a-22c submits a print job to a virtual printer group that includes printers 32a and 32b, and selects "Generic Labels" in universal paper catalog 44, paper catalog translator 48 will translate the media selection to "Labels" for any portion of the print job directed to printer 32a, and to "Label" for any portion of the print job directed to printer 32b.

Referring again to FIG. 4, tray associator 50 may be used to associate paper catalog entries in universal paper catalog 44 to device-specific media trays and/or media attributes of printers coupled to server 28'. In particular, tray associator 50 associates previously defined entries in universal paper catalog 44 with media tray and media attribute designations, such as media type. Referring to FIG. 13, an exemplary tray associator in accordance with this invention is described. Tray associator 50 includes a two dimensional array including lists of printers 82 and paper catalog labels 84. Expand/Contract buttons 88 may be used to obtain detailed media tray information 90 about each printer in list 82. Thus, Printer 32c has three media trays (Tray 1, Tray 2 and Tray 3), whereas Printer 32d has just two media trays (Tray 1 and Tray 2). Paper catalog label list 84 may be used to associate media trays 90 with predefined labels from universal paper catalog 44. In particular, pulldown menu 92 may be used to select a label from universal paper catalog 44 that will be associated with the specified media tray.

In the example shown in FIG. 13, Tray 1 of Printer 32c has been associated with label "Default," and Tray 2 of Printer 32d has been associated with label "John's Tabs." On some printers, a media type (or other device-specific media attribute) must be specified in addition to specifying a media tray for proper printer operation (e.g., to avoid media jams). For such printers, optional media type list 86 may be used to further associate media trays 90 with device-specific media attributes, as listed in the native device printer's driver. In particular, scrolling window 96 may be positioned adjacent a specific media tray 90, and pulldown tab 98 may be used to select a media type (or other device-specific media attribute) that will be associated with the specified media tray. Thus, Tray 2 of Printer 32c has been associated with type "Bond," and Tray 1 of Printer 32d has been associated with type "Label." Thus, if a user of any of client computers 22a-22c submits a print job to a virtual printer group that includes printers 32c, and selects "XYZ Co." in universal paper catalog 44, tray associator 50 will associate the media selection to Tray 2 for any portion of the print job directed to printer 32c. Similarly, if a user of any of client computers 22a-22c submits a print job to a virtual printer group that includes printers 32d, and selects "John's Tabs" in universal paper catalog 44, tray associator 50 will associate the media selection to Tray 2 and media type to "Tab" for any portion of the print job directed to printer 32d.

Referring now to FIGS. 3, 12, 13 and 14, an exemplary method for submitting a print job and specifying media in a cluster printing system in accordance with this invention is described. Beginning at step 102, a user of any of client computers 22a-22c submits a print job to a virtual printer group. For example, a user of client computer 22a may submit print job 24a to a virtual printer group that includes printer 32a-32d. At step 104, the user selects media for print job 24a from universal paper catalog 44. For example, the user may select "John's Tabs" from universal paper catalog 44. At step 106, server 28' selects printers from within the virtual printer group for printing the print job. As described above, server 28' may load balance the print job among multiple printers, split color from black-and-white pages in the same document, route a print job to the best available printer based on the number of pages and other characteristics, send a print job to an alternate printer if a currently selected printer is out of paper or toner or if there is a paper jam, and automatically send certain types of jobs to specific printers, based on specified criteria such as media characteristics, finishing options and device capabilities.

Once the job is divided between printers in the virtual printer group, the media selected from universal paper catalog 44 is communicated to the various printers in a format that each printer understands. Thus, at step 108, if portions of print job 24a are sent to printers that use a paper catalog (e.g., printers 32a and 32b), the media selected from universal paper catalog 44 is translated to attribute names and associated values in device-specific paper catalogs in the virtual printer group. In the example describe above, John's Tabs is translated to the name "Tab 1" in Paper Catalog 1 and the style "Tab" in Paper Catalog 2. Similarly, at step 110, if portions of print job 24a are sent to printers that use media tray or media attribute pulldown menus (e.g., printers 32c and 32d), the media selected from universal paper catalog 44 is associated to device-specific trays and attributes of corresponding printers in the virtual printer group. In the example described above, John's Tabs is associated to Tray 2 of printer 32d (and optionally to type "Tab").

Exemplary apparatus for implementing at least some aspects of this invention include a general purpose computing device, such as a personal computer, and a server computer, such as a server used in cluster printing systems. Such computing devices may include a computer memory such as read only memory, hard disk, magnetic disk, optical disk, or other suitable memory that may be used to store software modules and other data, such as universal paper catalog data, paper catalog translator data, tray associator data, exported paper catalog data, or other similar files used to implement methods of the present invention.

The foregoing merely illustrates the principles of this invention, and various modifications can be made by persons of ordinary skill in the art without departing from the scope and spirit of this invention.

The invention claimed is:

1. A system comprising a server computer coupled to a client device and a plurality of printers, the plurality of printers coupled to form a virtual printer group, each of the printers comprising a corresponding device-specific media selection technique, the server computer further comprising:
   a paper catalog comprising a plurality of entries, each entry associating a name with a media attribute;
   a means for selecting media for printing a print job to the virtual printer group by selecting an entry in the paper catalog; and
   a means for translating the name of the selected entry to a form that is compatible with a plurality of the device-specific media selection techniques, the device-specific media selection techniques comprising at least two different media selection techniques.

2. The system of claim 1, wherein one of the corresponding device-specific media selection techniques comprises a paper catalog.

3. The system of claim 1, wherein one of the corresponding device-specific media selection techniques comprises a media tray pulldown menu.

4. The system of claim 1, wherein one of the corresponding device-specific media selection techniques comprises a media attribute pulldown menu.

5. The system of claim 1, wherein a first corresponding device-specific media selection technique comprises a first paper catalog, and a second corresponding device-specific media selection technique comprises a second paper catalog.

6. The system of claim 5, wherein the first paper catalog and the second paper catalog are the same paper catalog.

7. The system of claim 5, wherein the first paper catalog and the second paper catalog are not the same paper catalog.

8. A method for use with a system that comprises a plurality of printers coupled to form a virtual printer group, each of the printers comprising a corresponding device-specific media selection technique, the method comprising:
   receiving a paper catalog that comprises a plurality of entries, each entry associating a name with a media attribute;
   selecting an entry in the paper catalog to select media for printing a print job to the virtual printer group; and
   translating the name of the selected entry to a form that is compatible with a plurality of the device-specific media selection techniques, the device-specific media selection techniques comprising at least two different media selection techniques.

9. The method of claim 8, wherein one of the corresponding device-specific media selection techniques comprises a paper catalog.

10. The method of claim 8, wherein one of the corresponding device-specific media selection techniques comprises a media tray pulldown menu.

11. The method of claim 8, wherein one of the corresponding device-specific media selection techniques comprises a media attribute pulldown menu.

12. The method of claim 8, wherein a first corresponding device-specific media selection technique comprises a first paper catalog, and a second corresponding device-specific media selection technique comprises a second paper catalog.

13. The method of claim 8, wherein the first paper catalog and the second paper catalog are the same paper catalog.

14. The method of claim 12, wherein the first paper catalog and the second paper catalog are not the same paper catalog.

15. The method of claim 12, wherein one of the printers comprises a device-specific media selection technique that has a media tray pulldown menu including a media tray, the method further comprising associating the selected name to the media tray.

\* \* \* \* \*

UNITED STATES PATENT AND TRADEMARK OFFICE
CERTIFICATE OF CORRECTION

PATENT NO. : 7,648,293 B2 Page 1 of 1
APPLICATION NO. : 11/736466
DATED : January 19, 2010
INVENTOR(S) : Pierre Lermant and Nick Hartzel It is certified that error appears in the above-identified patent and that said Letters Patent is hereby corrected as shown below:

Column 11, line 5, claim 13 shows as being dependent upon claim "8", however, it should show as being dependent upon claim --12--. Claim 13 should appear as follows:

13. The method of claim 12, wherein the first paper catalog and the second paper catalog are the same paper catalog.

Signed and Sealed this

Fifteenth Day of June, 2010

David J. Kappos
*Director of the United States Patent and Trademark Office*